June 10, 1941.  M. ZAIGER  2,245,244
WINDSHIELD WIPER ARM
Filed Aug. 1, 1940
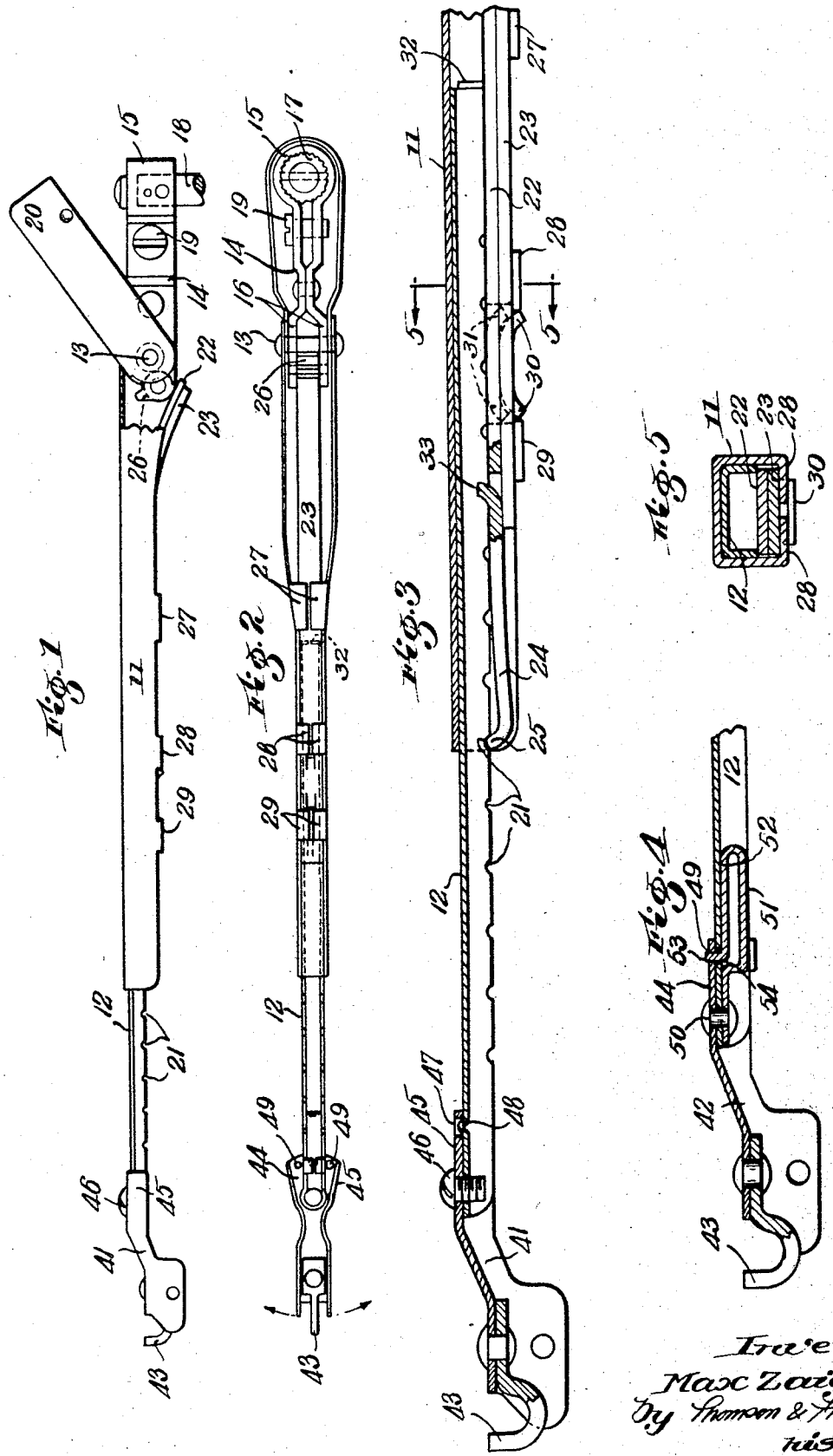
Inventor
Max Zaiger
By Thomson & Thomson
his Attys.

Patented June 10, 1941

2,245,244

UNITED STATES PATENT OFFICE 2,245,244

WINDSHIELD WIPER ARM

Max Zaiger, Swampscott, Mass.

Application August 1, 1940, Serial No. 349,139

5 Claims. (Cl. 15—250)

This invention relates to windshield wiper arms, and pertains more particularly to improvements in adjustable arms for windshield wipers or the like.

Because of the varying size of automobile windshields and the varying location of the rocker or operating shaft of the wiper motor, wiper arms are normally manufactured in graded lengths and it is frequently necessary to bend or deflect the free end of the arm in order that the wiper blade carried thereby will oscillate over the particular area which should be cleaned for best vision of the driver. Although longitudinally adjustable wiper arms have heretofore been provided, as shown for example in my Patent Number 2,087,178, such adjustable arms have not been universally accepted, because they have not been designed to best suit modern conditions and also because the telescoping rods or bars thereof cannot be bent to give the desired angular relationship of the blade, without impairing the slidability of the bar.

It is, therefore, the principal purpose of the present invention to improve the construction and operation of the longitudinally adjustable arms; and also to provide the telescoping bar thereof with a pivoted tip or terminal which may easily be adjusted to the desired angular relationship with respect to the sleeve portion of the arm, thereby permitting the wiper blade to be properly positioned with respect to the surface to be cleaned, without disturbing the arm itself.

Further objects reside in the structural features of the recommended embodiments of the invention illustrated in the accompanying drawing, which ensure easy adjustability of the blade-attaching tip or terminal of the arm, both longitudinally and angularly thereof, and which thus contribute to effective location of the blade on the windshield.

In the drawing:

Fig. 1 is a side elevation, partly in section, of the improved wiper arm;

Fig. 2 is a bottom view of the arm shown in Fig. 1 equipped with a modified form of a blade-connecting member or terminal;

Fig. 3 is a fragmentary longitudinal section, to larger scale, of the arm shown in Fig. 1;

Fig. 4 is a view similar to Fig. 3 showing the terminal end portion of the arm illustrated in Fig. 2; and Fig. 5 is a transverse section on line 5—5 of Fig. 3.

The improved wiper arm comprises a channeled sleeve 11 and a channeled bar 12 slidable longitudinally of the sleeve 11 and adapted to be held in adjusted position as hereinafter explained, the sleeve being pivoted at 13 to a link member 14 consisting of a strip of metal doubled upon itself to provide a sleeve 15 at its outer end and a fork 16 hinged to the pivot 13 at its inner end. The sleeve 15 is adapted to receive a knurled collar 17 which fits upon and is pinned to the end of the oscillating rock shaft 18 of the wiper motor (not shown); and it will be evident that the collar 17 may be made with bores of various sizes to fit rock shafts of varying diameter. The sleeve 15 is secured to the collar by tightening the screw 19. A cover 20, hinged to the pivot 13, fits over and normally conceals the link 14 and its associated parts and protects them from the weather, but may be tilted outwardly on its pivot, as shown in Fig. 1, to afford easy access to the fastening elements.

The bottom edges of the channeled bar 12 are provided with a series of longitudinally spaced notches 21 arranged in opposite pairs; and the channeled sleeve 11 is provided with a pair of superposed spring members 22 and 23, the outer end 24 of spring 22 extending beyond the outer end of spring 23 and being provided with a hook or pawl 25 selectively engageable in the respective pairs of notches 21 to hold the telescoping ratchet bar in adjusted position longitudinally of the sleeve. The inner ends of the springs 22 and 23 extend into operative relationship with a pressure roller 26 pivoted between the forked ends 16 of the link 14, the axis of the roller being offset from the pivot 13 so that the roller exerts substantial pressure on the rear end of the spring 22 and the underlying end of spring 23, as indicated in Fig. 1, when the wiper arm is in operative position to oscillate the wiper blade over the surface of a windshield.

The two springs are held in effective relation to the sleeve 11 and the slidable bar 12 by a series of straps 27, 28, and 29, formed integral with the sides of the sleeve 11 and engaging under the spring 23; and cooperating elements are formed on the two springs to prevent relative longitudinal movement therebetween. As best shown in Fig. 3, each spring is provided with a pair of downwardly struck tongues 30 and 31, respectively, the tongues 30 being held in position between the straps 28 and 29, and the tongues 31 entering the spaces formed in the spring 23 by striking out the tongues 30. Thus, the two springs are interlocked and restrained from longitudinal movement relative to each other or relative to the sleeve 11; and they are retained in operative relation to the pressure roller 26 and to the notched edges or ratchet of the slidable bar 12.

It is thus apparent that the bar 12 is held in adjusted position by the pawl 25 at the outer end 24 of the spring 22, but that said outer end will yield downwardly when the bar is pushed inwardly or pulled outwardly to move it to a new adjusted position. Outward movement of the bar with respect to the sleeve is limited by stop members comprising an inwardly bent lug 32 at the inner end of the bar 12, and a tongue 33 struck upwardly from the spring member 22 into the path of movement of the bar end 32.

By using two flat springs of relatively thin stock, instead of a single spring member of heavier stock, the interlocking tongues 30 and 31, the stop tongue 33 and the pawl 25 may be formed very easily by simple stamping operations; the free outer end of the spring yields more readily to permit manual longitudinal adjustment of the bar 12; and the cooperative resilience of the two springs is adequately effective to transmit pressure from the roller 16 and thus press the wiper blade carried by the outer end of the bar 12 against the windshield with the desired force for efficient operation.

As herein disclosed, the free end of the bar 22 is provided with two optional forms of tips or terminals 41 and 42, respectively, connectable in the usual manner to a clip of the wiper blade (not shown) by means of a hook 43; and in both forms the tip is pivotally connected to the arm 12 in such a manner that it may be readily moved to adjusted position in line with or at an angle to the wiper arm, so that the blade carried by the tip may assume an angular position with respect to the arm and thus be more effective in cleaning a desired area of the windshield.

In the form shown in Figs. 1 and 3, the tip 41 has a fan-shaped portion 45, wider than the outer end of the bar 12, pivoted to said end by a screw 46. The fan part 45 has a series of spaced pockets or openings 47, and the top of the bar is provided with a stud or detent 48 selectively engageable in one of the openings 47, to hold the tip 41 in adjusted angular position with respect to the bar, when the screw 46 is tightened. It will be evident that the relative position of the parts may be adjusted or readjusted by loosening the screw 46, without requiring special tools for this operation; and that, when the screw is tightened, the tip will be firmly held in position by the engagement of the stud 48 in one of the pockets 47.

In the form shown in Figs. 2 and 4, the tip 42 has a fan-shaped end 44, similar to the end 45 of tip 41 and also provided with a series of pockets or openings 49. In this case, the tip is pivoted to the bar 12 by a rivet 50, and a spring member 51, also secured by the rivet 50, has a bowed portion 52 formed with an upwardly directed stud 53 which projects through an opening 54 in the top of the bar and into one of the pockets or openings 49 of the terminal part 44. The rivet 50 is sufficiently loose to permit the terminal to be moved readily from side to side with respect to the bar 12; but the tip is firmly held in adjusted position by the interlocking engagement of the stud 53 in one of the openings 49. Such engagement may easily be released by pressing down on the spring stud 53 with the finger nail, so that the relative angular position between the arm and the tip or terminal 42 may be readjusted from time to time whenever it is desired, without special tools or equipment.

A wiper arm constructed as herein described is relatively simple and economical to manufacture, and durable and effective in use. The two adjustments, both angular and longitudinal, cooperate in fixing the relative position of the wiper blade carried by the terminal of the arm with respect to the sleeve portion of the arm; and the special features of each adjustable connection contribute to the efficient operation of the wiper arm as a whole as well as to the easy adjustability of each connection. It will be understood, however, that the structural details of the apparatus herein described may be varied to suit particular purposes and conditions without departing from the essence of this invention as defined in the following claims.

I claim:

1. A wiper arm of the character described, comprising a bar, a terminal connectable to a wiper blade, means pivotally attaching the terminal to the end of the bar so that the terminal and a blade carried thereby may be moved angularly relative to the bar, the terminal having a relatively broad fan-shaped portion bearing on the bar and mutually interfitting elements on the fan-shaped bar and terminal remote from the pivot for locking the parts in predetermined angular relationship.

2. A wiper arm of the character described, comprising a long and narrow bar, a terminal connectable to a wiper blade, means pivotally attaching the terminal to the end of the bar so that the terminal and a blade carried thereby may be moved angularly relative to the bar, the terminal having a relatively broad portion bearing on the bar and provided with a plurality of spaced sockets, and the bar having a stud selectively engageable in one of said sockets positively to hold the parts in predetermined angular relationship.

3. A wiper arm of the character described, comprising a long and narrow bar, a terminal connectable to a wiper blade, means pivotally attaching the terminal to the end of the bar so that the terminal and a blade carried thereby may be moved angularly relative to the bar, the terminal having a relatively broad portion bearing on the bar and provided with a plurality of spaced apertures and the bar having a struck up detent selectively engageable in one of said apertures positively to hold the parts in predetermined angular relationship.

4. A wiper arm of the character described, comprising a bar, a terminal connectable to a wiper blade, means pivotally attaching the terminal to the end of the bar so that the terminal and a blade carried thereby may be moved angularly relative to the bar, the terminal having a relatively broad portion bearing on said bar and provided with a plurality of spaced apertures, the bar having an opening alignable with any one of said apertures, and a spring fixed to the bar and provided with a stud engaging the aligned opening and aperture, releasably to lock the parts in predetermined angular relationship.

5. A wiper arm of the character described, comprising a long and narrow bar, a terminal connectable to a wiper blade and having a relatively broad portion bearing on said bar, a pivot pin connecting the terminal to the end portion of the bar so that the terminal and a blade carried thereby may be moved angularly relative to the bar, the bar and the broad portion of the terminal having registering openings remote from the pivot, and positioning means extending through said openings for releasably locking the parts in adjusted angular relationship.

MAX ZAIGER.